(12) United States Patent
Keller

(10) Patent No.: US 9,035,176 B2
(45) Date of Patent: May 19, 2015

(54) SEPARATE CONNECTION DEVICE FOR GROUNDING ELECTRICAL EQUIPMENT COMPRISING A PLURALITY OF SEPARATE ELECTRICAL COMPONENTS

(75) Inventor: Marc Keller, Oberhergheim (FR)

(73) Assignee: Mobasolar S.A.S., Horbourg-Wihr (FR)

( * ) Notice: Subject to any disclaimer, the term of this patent is extended or adjusted under 35 U.S.C. 154(b) by 62 days.

(21) Appl. No.: 14/002,148

(22) PCT Filed: Mar. 9, 2012

(86) PCT No.: PCT/IB2012/000446
§ 371 (c)(1),
(2), (4) Date: Aug. 29, 2013

(87) PCT Pub. No.: WO2012/123797
PCT Pub. Date: Sep. 20, 2012

(65) Prior Publication Data
US 2013/0335877 A1     Dec. 19, 2013

(30) Foreign Application Priority Data

Mar. 11, 2011 (FR) ...................................... 11 52023

(51) Int. Cl.
*H05K 5/02* (2006.01)
*H05F 3/02* (2006.01)
(Continued)

(52) U.S. Cl.
CPC .. *H05F 3/02* (2013.01); *H01R 4/64* (2013.01); *Y02E 10/50* (2013.01); *F24J 2/5207* (2013.01); *F24J 2/5258* (2013.01); *Y02E 10/47* (2013.01); *H02S 20/00* (2013.01)

(58) Field of Classification Search
CPC ............... H05F 3/02; H05F 3/00; H01R 4/64; H01R 4/26; H01R 4/66; F24J 2/5207; F24J 2/5258; F24J 2/526; F24J 2/5211; H02S 20/00; Y02E 10/50; Y02E 10/47
USPC ....... 174/51, 40 CC, 520, 560, 561; 361/220, 361/1, 600, 601, 799, 801; 52/716.8, 173.3, 52/578, 718.04; 439/927, 557, 92, 95, 439/100, 99, 97, 436; 136/244, 252, 291
See application file for complete search history.

(56) References Cited

U.S. PATENT DOCUMENTS 4,406,505 A * 9/1983 Avramovich ................... 439/97
4,571,013 A * 2/1986 Suffi et al. ....................... 439/99
(Continued)

FOREIGN PATENT DOCUMENTS

EP    2 012 390 A2    1/2009
FR    2 965 671 A1    4/2012
(Continued)

OTHER PUBLICATIONS

French Search Report Corresponding to FR11/52023 mailed Jun. 15, 2011.
(Continued)

*Primary Examiner* — Angel R Estrada
(74) *Attorney, Agent, or Firm* — Davis & Bujold, P.L.L.C.; Michael J. Bujold

(57) ABSTRACT

A separate connection device (40) intended to be inserted between a metal frame (3), of an electrical component (1), and a metal supporting structure (20) in order to connect, electrically and separately, the frame to the supporting structure. The connection device (40) comprises a metal blade manufactured from spring steel which comprises two self-connecting end areas (45, 46) arranged in separate planes and comprising a set of sharp teeth (47) arranged in order to be embedded within the metal material and formed on a folded section of the metal blade so that the sets of teeth (37, 47) extend in opposite directions and in planes intended to intersect the planes of the frame (3) and of the supporting structure (20) when the connection device is mounted.

9 Claims, 5 Drawing Sheets

(51) Int. Cl.
*H01R 4/64* (2006.01)
*F24J 2/52* (2006.01)
*H01L 31/042* (2014.01)

(56) References Cited

U.S. PATENT DOCUMENTS 4,961,712 A * 10/1990 Schwenk et al. .............. 439/436
6,323,478 B1 * 11/2001 Fujisaki et al. ................ 136/291
7,900,407 B2 * 3/2011 Plaisted ........................ 52/173.3
8,475,185 B2 * 7/2013 Rivera et al. .................... 439/97
8,806,813 B2 * 8/2014 Plaisted et al. ............... 52/173.3

FOREIGN PATENT DOCUMENTS

WO 2007/103882 A2 9/2007
WO 2008/028151 A2 3/2008

OTHER PUBLICATIONS

International Search Report Corresponding to PCT/IB2012/000446 mailed Oct. 4, 2012.

* cited by examiner

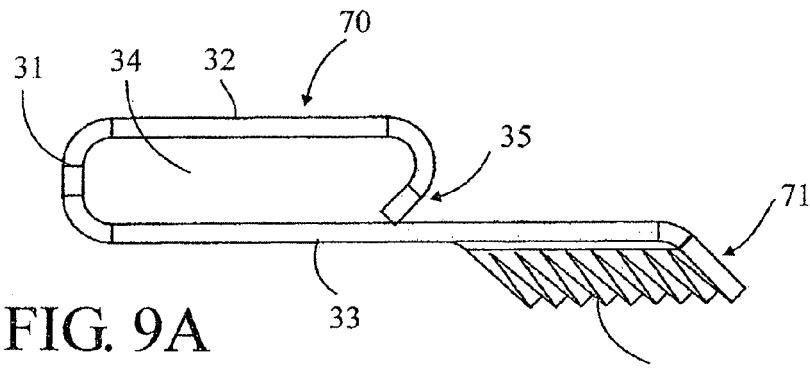
FIG. 9A
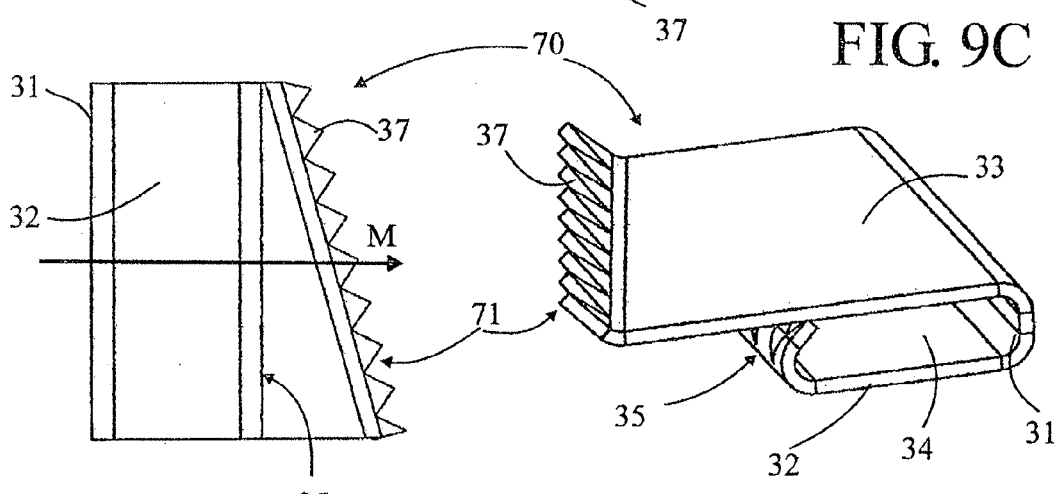
FIG. 9B
FIG. 9C
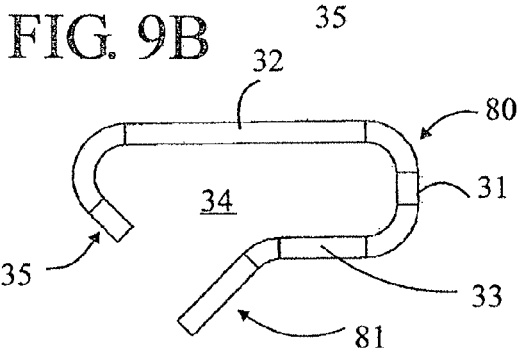
FIG. 10A
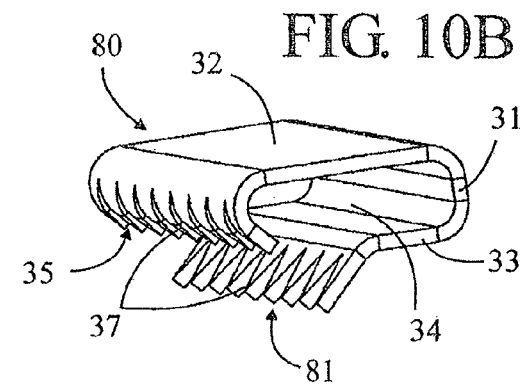
FIG. 10B
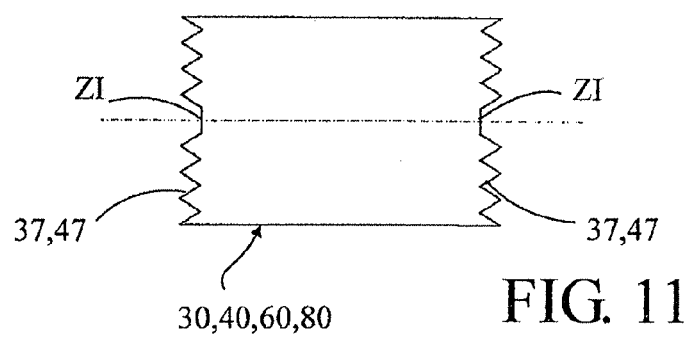
FIG. 11

SEPARATE CONNECTION DEVICE FOR GROUNDING ELECTRICAL EQUIPMENT COMPRISING A PLURALITY OF SEPARATE ELECTRICAL COMPONENTS

This application is a National Stage completion of PCT/IB2012/000446 filed Mar. 9, 2012, which claims priority from French patent application serial no. 11/52023 filed Mar. 11, 2011.

FIELD OF THE INVENTION

The present invention relates to a separate connection device for grounding electrical equipment comprising a plurality of separate electrical components, in particular photovoltaic panels, each electrical component being delimited by a metal frame arranged so as to be fastened on a metal supporting structure, said separate connection device being intended to be inserted between said metal frame of each electrical component and said metal supporting structure for electrically and separately connecting said metal frame of each electrical component to said metal supporting structure, said separate connection device comprising a metal blade comprising at least one closed fold arranged so as to form a plug-on assembly area.

BACKGROUND OF THE INVENTION

In all photovoltaic panel, thermal panel, hybrid thermal/photovoltaic panel or similar equipment, the metal frame of the panels must be grounded so as to meet the requirements of the electrical safety standards and to allow the flow of the leakage currents in case of anomalies, lightning, etc. To date, this grounding is carried out by wiring using an insulated copper conductor that is fastened to the metal frame of every photovoltaic panel by means of terminals and screws through holes or threaded holes provided in said frame. Each photovoltaic panel must be grounded individually, so that the removal of one panel does not disconnect the other panels from the grounding installation. Therefore, all photovoltaic panels of the equipment must be connected separately to the ground connection according to a parallel connection, which requires a wiring extending from each photovoltaic panel to the ground connection of the equipment. This wiring operation can of course be carried out only by an authorized electrician and requires a relatively long intervention time on site. This intervention is all the more complicated to carry out as the equipment is installed at a high location, for example on a roof. Furthermore, the wiring operation requires great electrical wire lengths and a large number of connection accessories. In addition, the quality of the connection of the electrical wires by means of terminals and screws in holes made in the metal frame of the panels is not guaranteed, since this metal frame can be covered with a layer of an electrically insulating finish cover such as anodic oxidation, enameling or similar.

Publication WO 2008/028151 offers an electrical connection clip intended to be inserted between the frame of a photovoltaic panel and a supporting structure. This clip has the shape of a U-folded metal blade whereof one end is bent outwards so as to facilitate its fitting on the edge of the frame and the other end comprises tooth-shaped raised areas to ensure an electrical connection and pass through the protective layer of the parts to be connected. However, its shape does not allow it to become embedded in the metal material of both the metal frame and the supporting structure like a harpoon, and without possibility to remove it without using a tool. Consequently, the efficiency of the electrical contact is not guaranteed over time. On the other hand, and unlike the invention, this connection clip is not compatible with any type of photovoltaic panels or similar, and any kind of supporting structure, such as in particular a hollow rail.

Publications WO 2007/103882 and EP 2 012 390 describe other metal clip shapes arranged to connect electrically photovoltaic panels with each other having a shape very specific to the considered application and that do not allow meeting the objectives pursued by the invention.

SUMMARY OF THE INVENTION

The present invention aims to offer a solution for this problem that will allow guaranteeing the quality of the electrical connection of the grounding of each photovoltaic panel in a very short intervention time, without having to entrust a qualified person with this work, while eliminating or reducing significantly the wiring requirements, by means of a simple, cost-effective, easy-to-use, reliable and versatile connecting device.

To that purpose, the invention relates to a separate connection device as defined in the preamble, characterized in that said metal blade is made of spring steel and in that said connection device comprises at least two self-connecting end areas arranged in separate planes and designed to create an electrical contact between said metal frame of said electrical component and said metal supporting structure, said self-connecting end areas comprising sets of sharp teeth arranged in order to be embedded in the metal material of said frame and of said supporting structure, and being formed on a folded section of said metal blade so that the teeth extend in opposite directions and in planes intended to intersect the planes of said frame and of said supporting structure when the connection device is mounted.

The particular shape of the self-connecting end areas allows one of these areas to bite the metal frame of the electrical component and the other of these areas to bite the metal supporting structure, while opposing its removal. Furthermore, thanks to such configuration, the teeth embed in the metal material both of the metal frame and of the metal supporting structure when pressing the connection device to insert it between the electrical component and the supporting structure, ensuring a very good electrical contact with a negligible or even zero ohmic resistance. Therefore, once it is inserted between the metal frame of an electrical component and the metal supporting structure, the connecting device according to the invention self-locks thanks to its shape, its elasticity properties and its end areas, which ensure an anchorage like a harpoon, with a constant pressure thanks to the spring effect of the material of the blade, including on a supporting structure comprising a hollow rail.

In a first embodiment variant, said metal blade can have a general U shape, one of the self-connecting end areas being oriented towards the inside of the U and the other self-connecting end area being oriented towards the outside of the U.

According to the embodiments, said self-connecting end area oriented towards the outside of the U can be located away from said assembly area by means of an extension and oriented in a direction substantially perpendicular to the U. It can be beveled so that the teeth are aligned with a straight line that is not parallel to said assembly area. It can also be located in way of the assembly area.

In a second embodiment variant, said metal blade can have a general S shape, the two self-connecting end areas being oriented respectively towards the outside of the S.

To optimize its manufacturing, said connection device can include an indexing area that can be formed by the absence of a tooth in every set of teeth.

This goal is also reached by an electrical equipment comprising a plurality of separate electrical components, in particular photovoltaic panels, each electrical component being delimited by a metal frame designed to be fastened onto a metal supporting structure and connected electrically and separately to said metal supporting structure by means of at least one individual connection device as defined above, inserted between said metal frame of each electrical component and said metal supporting structure.

BRIEF DESCRIPTION OF THE DRAWINGS

The present invention and its advantages will be better revealed in the following description of two embodiments given as a non limiting example, in reference to the drawings in appendix, in which:

FIGS. 10A and 10B are side and perspective views of a fifth embodiment of a connecting device according to the invention, and FIG. 11 is a top view of a sixth embodiment of a connecting device according to the invention shown flat before folding.

DETAILED DESCRIPTION OF THE PREFERRED EMBODIMENTS

The following description relates to electrical equipment comprising a plurality of photovoltaic panels 1. Of course, the connection device according to the invention applies to any type of separate electrical components requiring grounding, such as thermal panels, hybrid thermal/photovoltaic panels or similar, as well as to the inverters or micro-inverters belonging to said equipment and to any other metallic surface of an electrical equipment requiring grounding.

Figure 1:
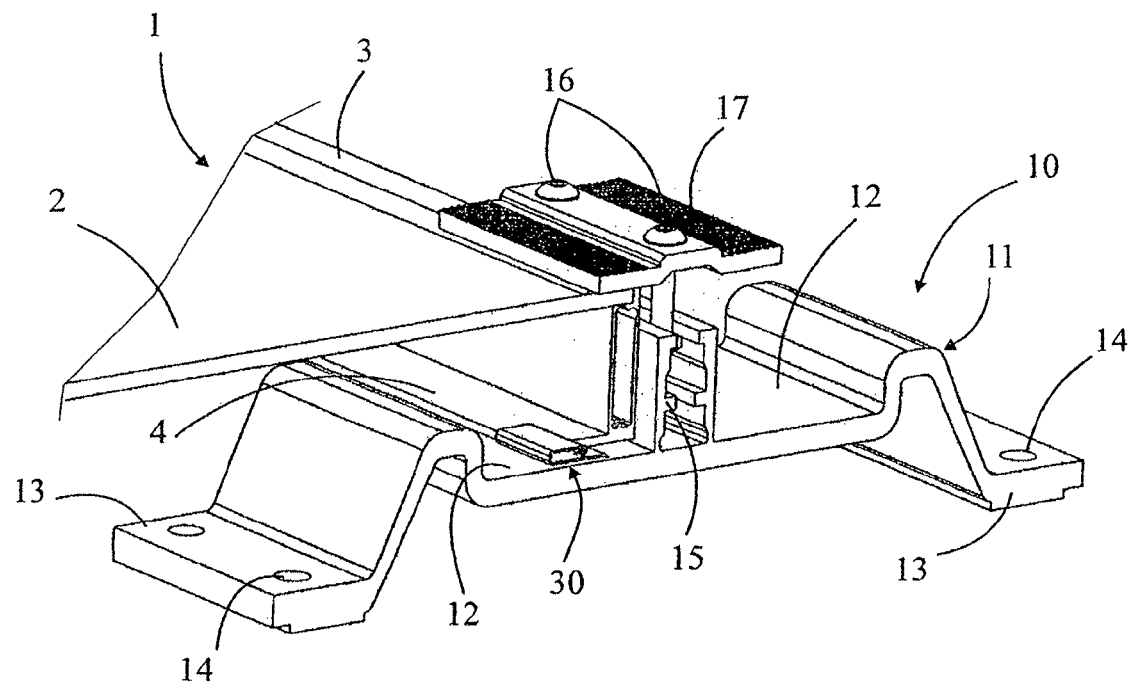
FIG. 1 is a detailed perspective view of a first mounting example of a photovoltaic panel showing a first embodiment of a connecting device according to the invention.
Figure 2:
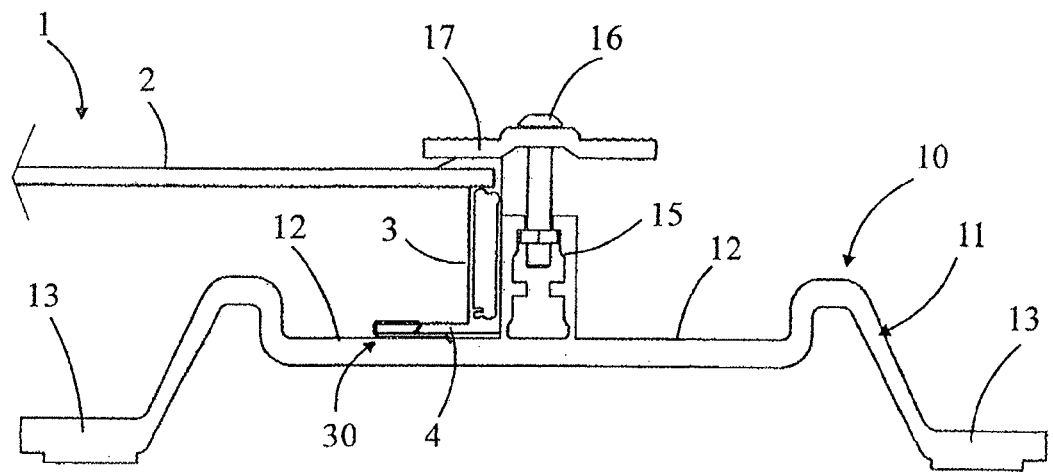
FIG. 2 is a side view of the assembly of FIG. 1, FIGS. 3A and 3B are side and perspective views of the connecting device of FIGS. 1 and 2.

The photovoltaic panels 1 comprise in a known way, and in reference to the figures, a plate with photovoltaic cells 2 surrounded by a metal frame 3 that allows fastening them onto any kind of supporting structure 10, 20, 50, on the floor or at a high location, on fixed or movable structures, etc. This metal frame 3 can be made of raw, anodized, enameled, or similar, aluminum, or also in any other equivalent material, raw, treated or covered with a protection and/or finish layer. These photovoltaic panels 1 are mounted on a metal supporting structure 10, 20, 50 with a shape and design suitable for the application and the destination of said panels. The metal supporting structure 10, 20, 50 can be made of stainless, raw, galvanized, enameled or similar steel, of raw, anodized, enameled or similar aluminum, or of any other equivalent material. FIGS. 1, 2; 4, 5 and 7 illustrate three non limiting mounting examples of these photovoltaic panels.

In the first mounting example illustrated in FIGS. 1 and 2, the metal supporting structure 10 comprises a plurality of separate mounting brackets 11, each photovoltaic panel 1 being fastened to at least two and preferably four mounting brackets 11 located close to the corners of said panel, being understood that the mounting brackets 11 can be common to two adjacent panels. In the illustrated example, each mounting bracket 11 has substantially an omega Ω shape defining, on a flat central section, two areas 12 intended for receiving each the metal frame 3 of a photovoltaic panel 1, these receiving areas 12 being arranged symmetrically on both sides of a median rail 15 perpendicular to the flat central section 12. This flat central section is framed by two fastening lugs 13 provided with fastening holes 14 arranged to receive screws or similar allowing to fasten the mounting bracket 11 to a panel, a roof or similar. The median rail 15 is arranged to receive screws 16 or similar allowing to fasten the photovoltaic panel 1 by clamping between the corresponding receiving area 12 and a holding flange 17. In the invention, it is planned to ground the mounting brackets 11 by means of an electrical wire (not represented) connected to one of the holes 14 of the fastening lugs 13. The mounting brackets 11 of a same row can thus be connected serially to the ground connection of the equipment and the parallel rows of mounting brackets 11 can be connected in parallel to said ground connection.

Figure 3A:
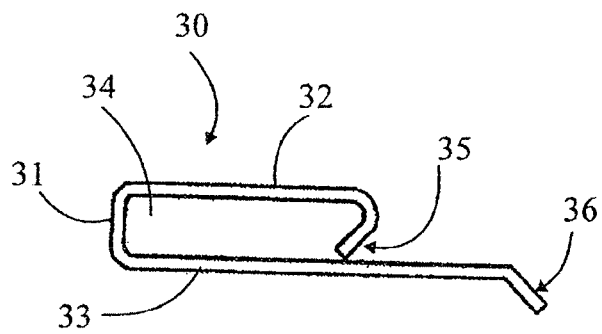
Figure 3B:
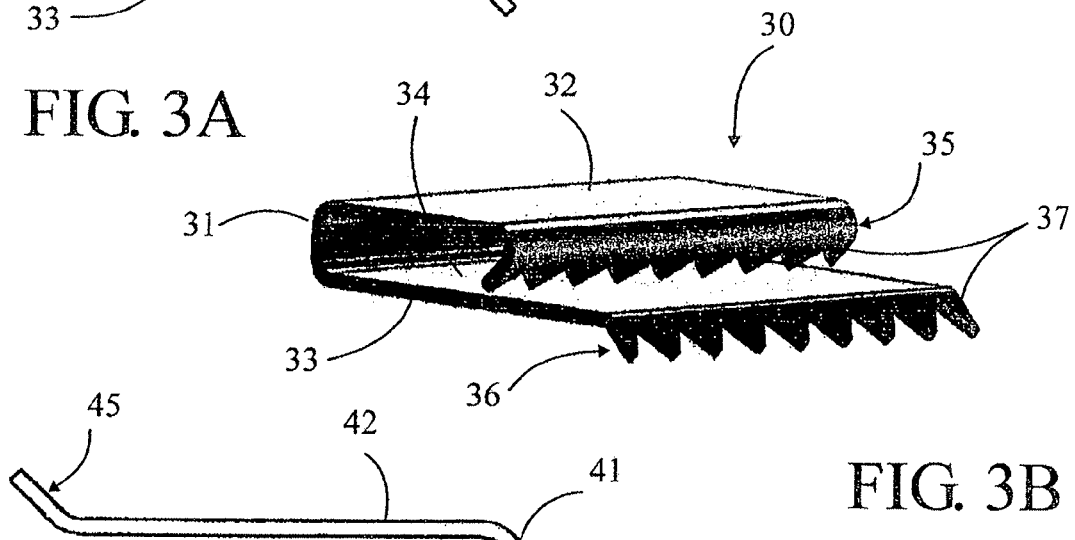

In this mounting example, the connection device 30 according to the invention is represented more in detail in FIGS. 3A and 3B. It is made of an elastic metal blade, for example out of stainless spring steel, having a general U shape. It comprises in a median area a closed fold 31 that delimits, between two substantially parallel walls 32, 33, an assembly area 34 designed to fit on the rear edge 4 of the metal frame 3 of the photovoltaic panel 1. The height of this assembly area 34 is substantially equal to the thickness of the rear wall 4. This connection device 30 comprises two self-connecting end areas 35 and 36 formed by a folded section of the elastic metal blade, arranged in separate planes and oriented in opposite directions. In the description, the term "opposite" does not necessarily mean that the directions are diametrically opposite, but that the two end areas oppose each other in order to prevent the accidental dismounting of the connection device. The end area 35 is connected to the wall 32 by a closed fold, oriented towards the inside of the U and towards the fold 31 in order to bite the rear edge 4 of the metal frame 3 and to oppose its removal like a harpoon. The end area 36 is connected to the wall 33 by an open fold, oriented towards the outside of the U and opposite to the fold 31 in order to bite the receiving area 12 of the mounting bracket 11. Each self-connecting end area 35, 36 comprises a set of pointed or sharp teeth 37 arranged to embed in the metal material both of the metal frame 3 of the photovoltaic panel 1 when pressing the connection device 30 to insert it on the rear edge 4, and of the mounting bracket 11 when tightening the screws 16 and the holding flange 17. The teeth 37 can be replaced with any other equivalent shape allowing to pass through, pierce or remove the protective layer of the metal parts of the photovoltaic panel 1 and of the supporting structure 10 with the goal of ensuring a very good electrical contact with a negligible or even zero ohmic resistance. Since the metal frame 3 of the panels and the mounting brackets 11 are generally manufactured out of aluminum or similar, the electrical contact created by and with the connection device 30 does not generate any electrolytic corrosion, ensuring a reliable quality overtime.

Figure 4:
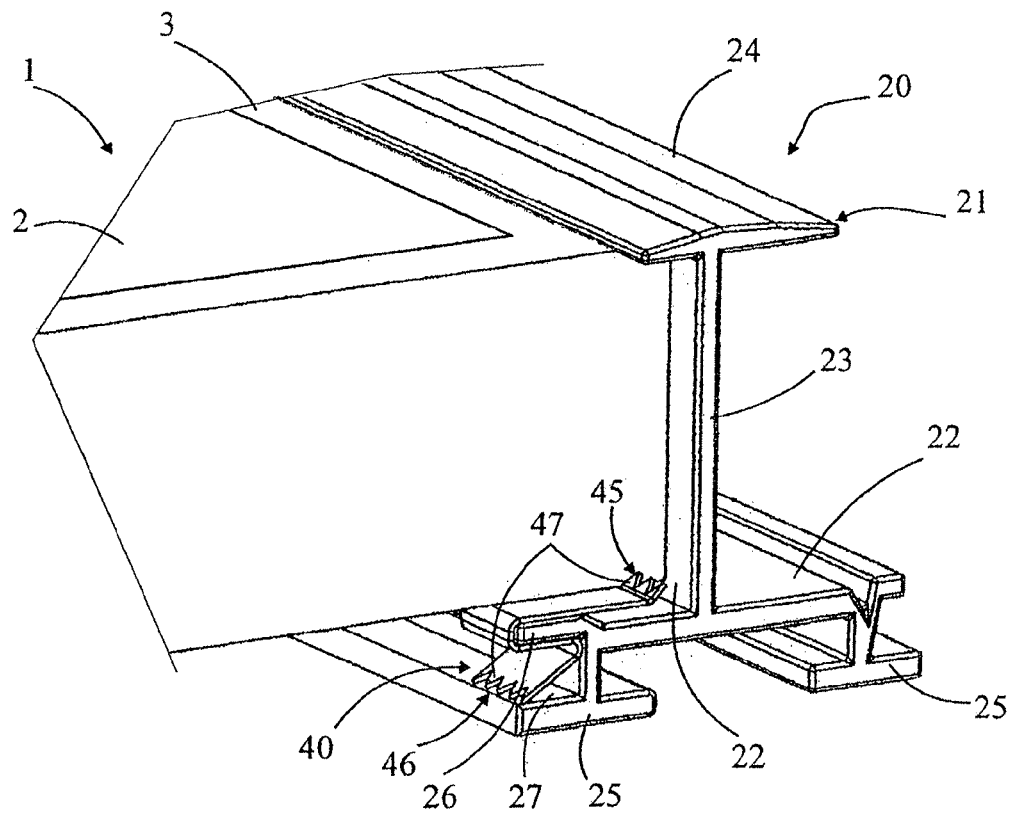
FIG. 4 is a detailed perspective view of a second mounting example of a photovoltaic panel showing a second embodiment of a connecting device according to the invention.
Figure 5:
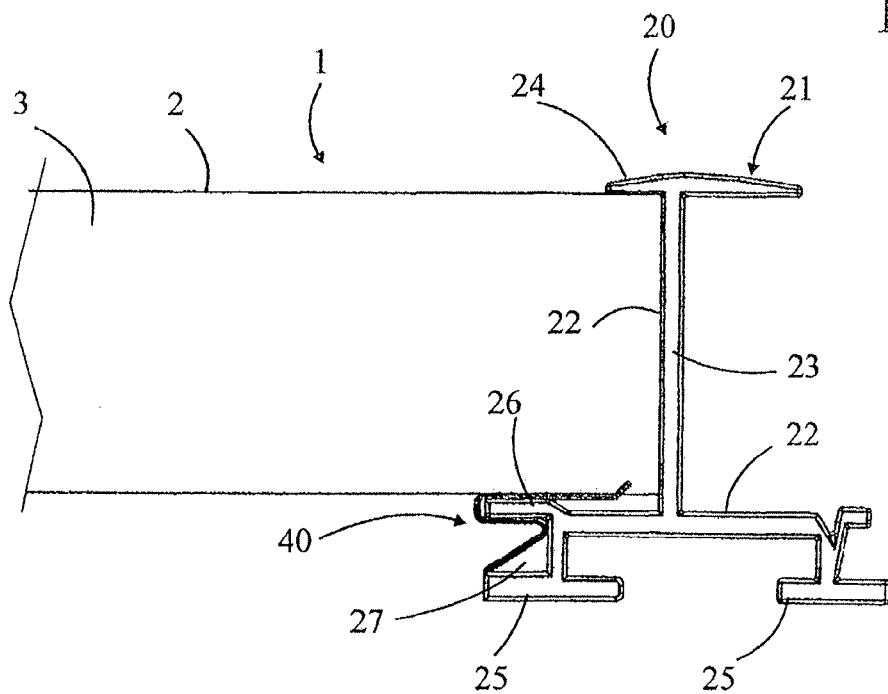
FIG. 5 is a side view of the assembly of FIG. 4, FIGS. 6A and 6B are side and perspective views of the connecting device of FIGS. 4 and 5.

In the second mounting example illustrated in FIGS. 4 and 5, the metal support structure 20 comprises a plurality of parallel mounting rails 21 that are common to several photovoltaic panels 1, so that the photovoltaic panels 1 of a same row are held between two parallel mounting rails 21. The mounting rails 21 are also common to two adjacent rows of photovoltaic panels 1. Each mounting rail 21 has substantially the shape of an I, defining two receiving areas 22 for the metal frame 3 of a photovoltaic panel 1, these receiving areas 22 being arranged symmetrically on both sides of the central leg 23 of the I. The upper section 24 of the mounting rail 21 is dissymmetrical to allow mounting the photovoltaic panels 1 by fitting one of the upper or lower edges in one of the mounting rails 21 and subsequently fitting the other upper or lower edge in the opposite mounting rails 21. This way the photovoltaic panels 1 are held between two parallel mounting rails 21 without any fastening element that would exert mechanical constraints on these panels. This particular mounting method is simple and fast to implement. In addition, it allows achieving an assembly of photovoltaic panels on a flat surface as well as on a curved surface, or even on a slanted surface, since the connection devices 40 reinforce the mechanical locking of the panels, as explained later. Each mounting rail 21 is carried by two parallel profiles 25 having a reversed T shape, arranged so as to be mounted in complementary profiles fastened on a panel, a roof or similar. These profiles 25 delimit with the base of the I of the mounting rail 21 grooves 27 opened towards the outside. The mounting rails 21 are connected in parallel to the ground connection of the equipment by means of wires.

Figure 6A:
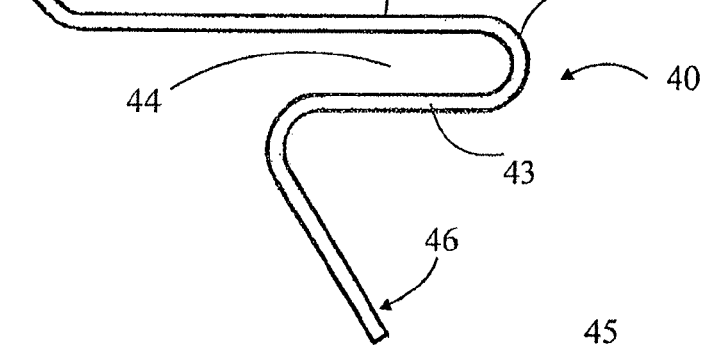
Figure 6B:
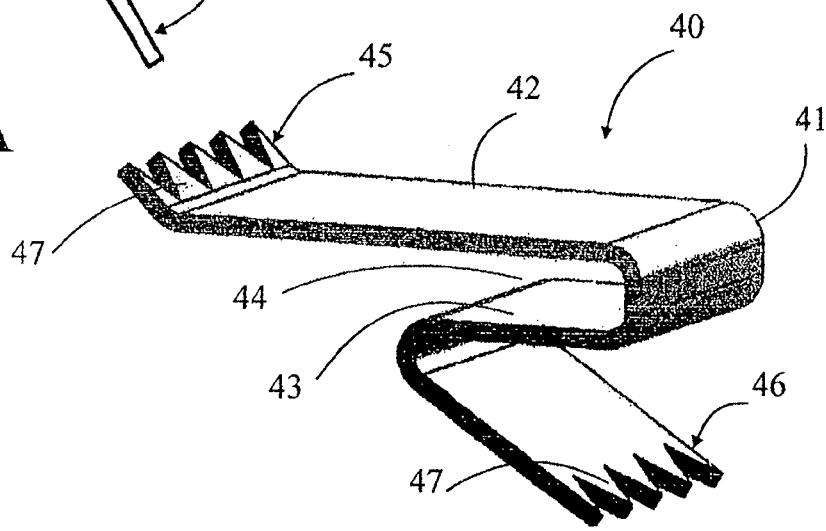

In this mounting example, the connection device 40 according to the invention is represented more in detail in FIGS. 6A and 6B. It is made of an elastic metal blade, for example out of stainless spring steel, having a general S shape. It comprises in a median area a closed fold 41 that delimits, between two substantially parallel walls 42, 43, an assembly area 44 designed to fit on the rear edge 26 of the mounting rail 21. The height of this assembly area 44 is substantially equal to the thickness of the rear wall 26. This connection device 40 comprises two self-connecting end areas 45 and 46 formed by a folded section of the elastic metal blade, arranged in separate planes and oriented in opposite directions. The end area 45 is connected to the wall 42 by an open fold, oriented towards the outside of the S and opposite to the fold 41 in order to bite the rear side of the metal frame 3 of the photovoltaic panel 1 and to oppose its removal like a harpoon. The end area 46 is connected to the wall 43 by a closed fold, oriented towards the outside of the S and towards the fold 41 in order to bite the corresponding groove 27 of the mounting rail 21 and to oppose its removal like a harpoon. Each self-connecting end area 45, 46 comprises a set of pointed or sharp teeth 47 arranged to embed in the metal material both of the mounting rail 21 when pressing the connection device 40 to insert it on its rear edge 26 and of the metal frame 3 of the photovoltaic panel 1 when fitting it in the mounting rail 21. As in the previous example, the teeth 47 can be replaced with any other equivalent shape allowing to pass through, pierce or remove the protective layer of the metal parts of the photovoltaic panel 1 and of the supporting structure 20 with the goal of ensuring a very good electrical contact with a negligible or even zero ohmic resistance. Since the metal frame 3 of the panels and the mounting rails 21 are generally manufactured out of aluminum or similar, the electrical contact created by and with the connection device 40 does not generate any electrolytic corrosion, ensuring a reliable quality over time. With this mounting method, the connection devices 40 reinforce the mechanical locking of the photovoltaic panels 1 on the mounting structure 20 and thus allow mounting said panels on slanted surfaces.

It can be easily understood that the U-shaped connection device 30 described in the previous mounting example can replace the S-shaped connection device 40 simply by fitting its assembly area 34 on the rear edge 26 of the mounting rail 21 and orienting the self-connecting end area 36 in the receiving area 22 of the mounting rail 21 so as to bite the frame 3 of the photovoltaic panel 1 when mounting it. So the U-shaped connection device 30 can be considered as a universal device.

Figure 7:
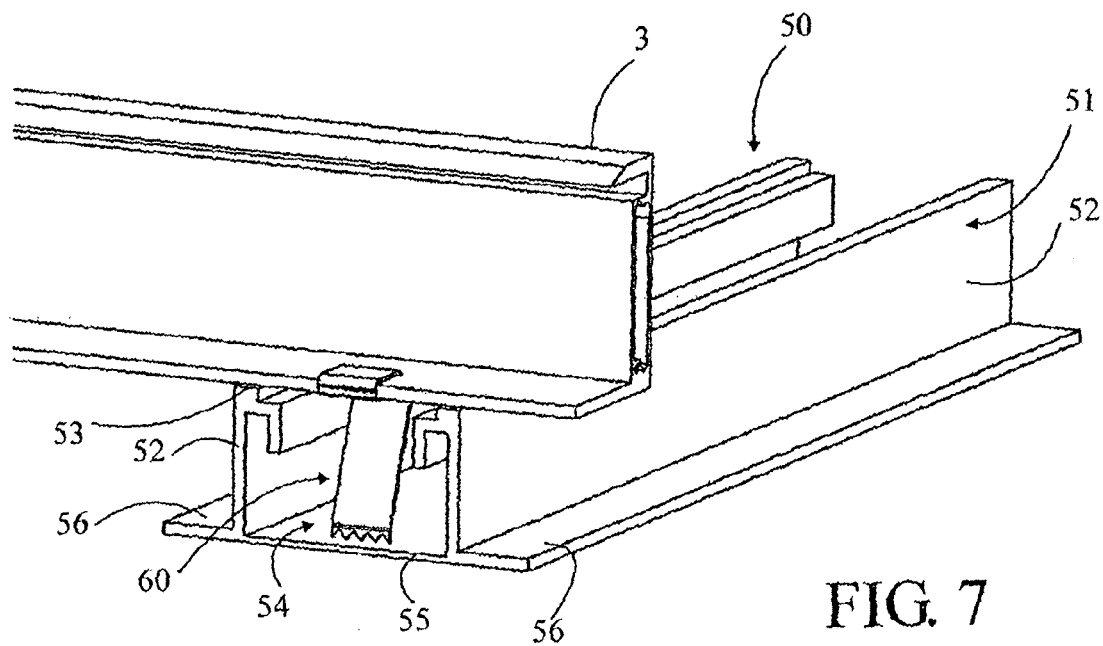
FIG. 7 is a detailed perspective view of a third mounting example of a photovoltaic panel showing a third embodiment of a connecting device according to the invention.

In the third mounting example illustrated in FIG. 7, the metal support structure 50 comprises a plurality of parallel mounting rails 51 that are common to several photovoltaic panels 1, so that the photovoltaic panels 1 of a same row are held in place on at least two parallel mounting rails 51. Each mounting rail 51 is hollow and has substantially a U shape whereof the upper end of the side legs 52 defines a flat receiving area 53 for the metal frame 3 of a photovoltaic panel 1 held in place by fastening brackets (not represented) fastened onto the mounting rails 51 as in the example of FIGS. 1 and 2. The side legs 52 delimit between each other a groove 54 to receive a connection device 60 as described hereafter. The base 55 of each mounting rail 51 extends beyond the side legs 52 with coplanar fastening lugs 56 arranged so as to be fastened on a panel, a roof or similar. The mounting rails 51 are connected in parallel to the ground connection of the equipment by wiring.

Figure 8A:
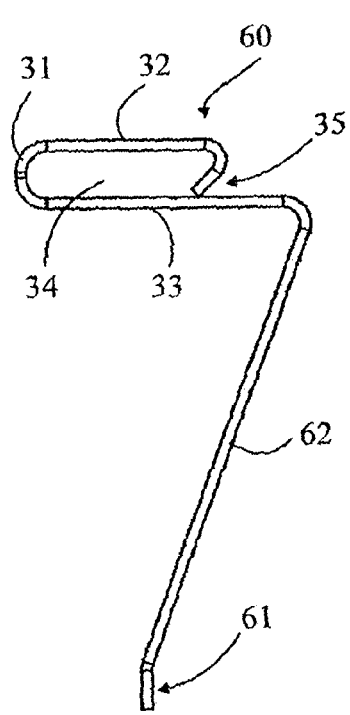
FIGS. 8A and 8B are side and perspective views of the connecting device of FIG. 7, FIGS. 9A, 9B and 9C are side, top and perspective views of a fourth embodiment of a connecting device according to the invention.
Figure 8B:
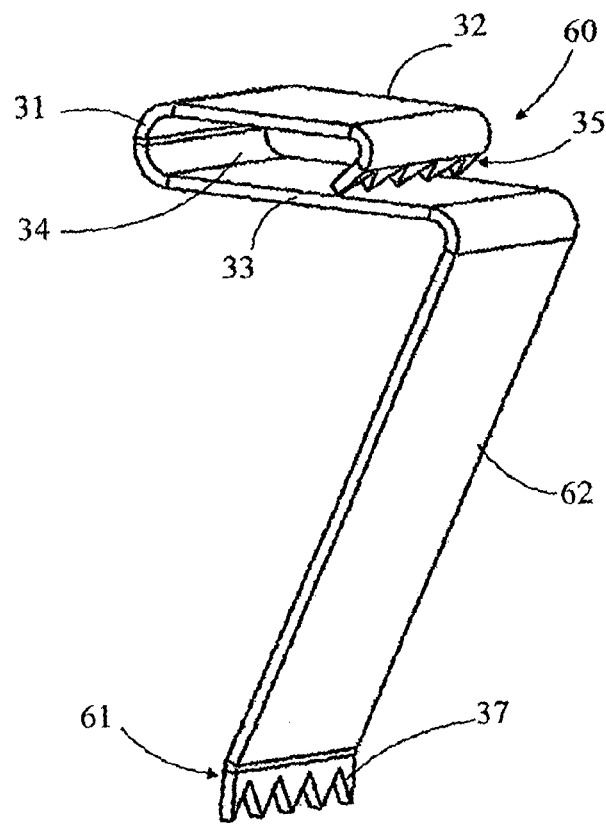

In this mounting example, the connection device 60 according to the invention is represented more in detail in FIGS. 8A and 8B. Its design is close to that of the connecting device 30 illustrated in FIGS. 3A and 3B. Therefore, the common parts bear the same reference numbers and are not described again. The connecting device 60 differentiates itself by the fact that the self-connecting end area 61 oriented towards the outside of the U is located away from the assembly area 34 by means of an extension 62 connected to the wall 33 by a closed fold. This self-connecting end area 61 is oriented in a direction substantially perpendicular to the U so as to bite the base 55 of the mounting rail 51. As in the previous examples, it comprises a set of pointed or sharp teeth 37 arranged to embed in the metal material of the mounting rail 51 when mounting the photovoltaic panel 1.

FIGS. 9A, 9B and 9C illustrate a connecting device 70 equivalent to that of FIGS. 3A and 3B. Therefore, the common parts bear the same reference numbers and are not described again. In this example, the self-connecting end area 71 oriented towards the outside of the U is not parallel with the assembly area 34 but beveled, so that the set of teeth 37 is aligned on a straight line that is not perpendicular to the mounting direction of the device represented by the arrow M, so as to bite the metal frame of the photovoltaic panel at different levels and cause larger scratches on its length.

FIGS. 10A and 10B illustrate a connecting device 80 equivalent to that of FIGS. 3A and 3B. Therefore, the common parts bear the same reference numbers and are not described again. In this example, the self-connecting end area 81 oriented towards the outside of the U is located in way of the assembly area 34 in order to adapt itself to other mounting rail types.

These few embodiment examples allow illustrating the multiple possibilities offered by the connection device of the invention to adapt itself to metal frames of electrical components, as well as to metal supporting structures of these components, that can be very different. In fact, the connection device according to the invention is a versatile device.

When the connecting devices 30, 40, 60, 70, 80 are put in place respectively on the metal frame 3 of each photovoltaic panel 1 and on the metal supporting structures 10, 20, 50, they lock themselves thanks at the same time to their shape, their elastic properties and their end areas that ensure an anchorage like a harpoon, with a constant pressure thanks to the spring effect of the spring steel blade. To dismount them, a tool must be used in order to remove the teeth that engage the material.

Possibilities for industrial application:

The connecting devices 30, 40, 60, 70, 80 as they are described are advantageously manufactured from a continuous strip of stainless spring steel or similar that is uncoiled and stamped flat according to the unfolded shape of the device to be manufactured. Each stamped part is then folded at the defined locations in order to give the device the required shape, in compliance with the various embodiments of FIGS. 3, 6, 8, 9 and 10 illustrated as non limiting examples. To optimize the industrialization of this manufacturing process, one can plan, when stamping the parts, an indexing area ZI that will allow positioning properly and accurately the stamped parts for handling and folding them. In the example illustrated in FIG. 11, the indexing area ZI is formed by the absence of a tooth in the center of each set of teeth 37, 47, indicating the centerline A of the part. Of course, any other indexing means can be considered.

This description shows clearly that the invention allows reaching the goals defined. In particular, when mounting a photovoltaic panel 1 equipment on a metal supporting structure 10, 20, 50 or similar:

one fastens previously either the mounting brackets 11 or the mounting rails 21, 51 or similar on a bearing panel, a roof, a frontage or similar, in order to create a metal supporting structure 10, 20, 50, one grounds these metal structures 10, 20, 50 by wiring, one puts the connection devices 30, 40, 60, 70, 80 in place, either directly on the photovoltaic panels 1 or directly on the mounting rails 21, 51 according to their configuration, they lock themselves, and one mounts the photovoltaic panels 1 on these mounting structures 10, 20, 50.

In the various cases, the photovoltaic panels 1 are grounded automatically through their metal supporting structure 10, 20, 50 and via the connecting devices 30, 40, 60, 70, 80, without having to carry out an additional wiring of each panel. The photovoltaic panels 1 are consequently connected automatically in parallel to the ground connection. So, the removal of a photovoltaic panel 1 does not disconnect the rest of the equipment from the ground, in compliance with the standards in force.

These connection devices 30, 40, 60, 70, 80 consequently have simultaneously several functions:

when putting them in place, they alter the surface of the metal frames 3 of the photovoltaic panels 1 and that of the mounting brackets or rails 11, 21, 51 in order to remove the anodized, enameled, or similar, layer, and embed themselves in the aluminum in order to create a good electrical contact with a negligible or even zero ohmic resistance, they exert a constant pressure in the aluminum thanks to their shape and to the spring effect of the elastic blades, ensuring the reliability of the electrical contact over time, in the mounting method illustrated in FIGS. 4 and 5, they reinforce the mechanical locking of the photovoltaic panels 1 in the mounting rails 21.

The present invention is not restricted to the examples of embodiment described, but extends to any modification and variant which is obvious to a person skilled in the art while remaining within the scope of the protection defined in the attached claims. Likewise, the example of application to photovoltaic panel equipment is not limiting and extends to any other type of electrical equipment comprising a plurality of separate components such as thermal panels, hybrid thermal/photovoltaic panels or similar, inverters and micro-inverters belonging to said equipment, as well as to any other metallic surface of an electrical equipment requiring grounding.

The invention claimed is:

1. A separate connection device (30, 40, 60, 70, 80), for grounding electrical equipment, comprising:

a plurality of separate electrical components (1), such as photovoltaic panels, each electrical component (1) being delimited by a metal frame (3) arranged so as to be fastened on a metal supporting structure (10, 20, 50), the separate connection device (30, 40, 60, 70, 80) being intended to be inserted between the metal frame (3) of each electrical component (1) and the metal supporting structure (10, 20, 50) for electrically and separately connecting the metal frame (3) of the electrical component (1) to the metal supporting structure (10, 20, 50), and the separate connection device (30, 40, 60, 70, 80) comprising a metal blade comprising at least one closed fold (31, 41) arranged so as to form a plug-on assembly area (34, 44), wherein the metal blade is an elastic metal blade of stainless spring steel, and the connection device comprises at least two self-connecting end areas (35, 36; 45, 46; 35, 61; 35, 71; 35, 81) arranged in separate planes and designed to create electrical contact between the metal frame (3) and the metal supporting structure (10, 20, 50), the self-connecting end areas comprise a set of sharp teeth (37, 47) arranged in order to be embedded in the metal material of the frame (3) and in the supporting structure (10, 20, 50) and formed on a folded section of the metal blade so that the teeth (37, 47) extend in opposite directions and in the separate planes intended to intersect the plane of the frame (3) and the plane of the supporting structure (10, 20, 50) when the connection device is mounted, in order to ensure a harpoon anchorage in the frame (3) and the supporting structure (10, 20, 50), with a constant pressure due to a spring effect of the material of the metal blade, opposing removal from the frame and from the supporting structure, and thereby achieving a self locking of the metal blade once the metal blade is inserted between the frame and the supporting structure.

2. The device according to claim 1, wherein the metal blade has a general U shape, one of the self-connecting end areas (35) is oriented toward an inside of the U shape and another of the self-connecting end areas (36, 61, 71, 81) is oriented towards an outside of the U shape.

3. The device according to claim 2, wherein the self-connecting end area (61) oriented toward the outside of the U shape is located, by an extension (62), away from the assembly area (34) and oriented in a direction substantially perpendicular to the U shape.

4. The device according to claim 2, wherein the self-connecting end area (71), oriented toward the outside of the U shape, is beveled so that the teeth (37) are aligned with a straight line that is not parallel to the assembly area (34).

5. The device according to claim 2, wherein the self-connecting end area (81) oriented toward the outside of the U shape is located in way of the assembly area (34).

6. The device according to claim 1, wherein the metal blade has a general S shape, and the two self-connecting end areas (45, 46) are oriented respectively toward an outside of the S shape.

7. The device according to claim 1, wherein the device includes an indexing area (ZI).

8. The device according to claim 7, wherein the indexing area (ZI) is formed by the absence of a tooth in each set of teeth (37, 47).

9. An electrical equipment comprising:
a plurality of separate electrical components (1), such a photovoltaic panels,
each electrical component (1) being delimited by a metal frame (3) arranged so as to be fastened on a metal supporting structure (10, 20, 50) and electrically and separately connected to the metal supporting structure (10, 20, 50) by at least one separate connection device (30, 40, 60, 70, 80), inserted between the metal frame (3) of each electrical component (1) and the metal supporting structure (10, 20, 50), the separate connection device (30, 40, 60, 70, 80) comprising a metal blade comprising at least one closed fold (31, 41) arranged so as to form a plug-on assembly area (34, 44), wherein the metal blade of each connecting device is an elastic metal blade manufactured from stainless spring steel,
each connection device comprises at least two self-connecting end areas (35, 36; 45, 46; 35, 61; 35, 71; 35, 81), arranged in separate planes and designed to create electrical contact between the metal frame (3) and the metal supporting structure (10, 20, 50),
the self-connecting end areas comprises a set of sharp teeth (37, 47) arranged in order to be embedded in the metal material of the frame (3) and of the supporting structure (10, 20, 50) and being formed on a folded section of the metal blade so that the teeth (37, 47) extend in opposite directions and in the separate planes intended to intersect the plane of the frame (3) and the plane of the supporting structure (10, 20, 50) in order to ensure harpoon anchoring in the frame (3) and in the supporting structure (10, 20, 50), with a constant pressure due to a spring effect of the material of the metal blade, opposing to removal of the metal blade from the frame and from the supporting structure, and thus achieving self locking of the metal blade once the metal blade is inserted between the frame and the supporting structure.

* * * * *